US012468369B2

(12) United States Patent
Wannasuphoprasit et al.

(10) Patent No.: US 12,468,369 B2
(45) Date of Patent: Nov. 11, 2025

(54) FORECASTING TIMESERIES ANALYSIS FOR ELECTRICAL VEHICLE BATTERY STATE UTILIZING A HYBRID TRANSFORMER ARCHITECTURE

(71) Applicant: Volkswagen Aktiengesellschaft, Wolfsburg (DE)

(72) Inventors: Saeth Wannasuphoprasit, San Francisco, CA (US); Gianina Alina Negoita, San Leandro, CA (US); William A. Paxton, Redwood City, CA (US)

(73) Assignee: Volkswagen Aktiengesellschaft, Wolfsburg (DE)

( * ) Notice: Subject to any disclaimer, the term of this patent is extended or adjusted under 35 U.S.C. 154(b) by 207 days.

(21) Appl. No.: 18/401,139

(22) Filed: Dec. 29, 2023

(65) Prior Publication Data

US 2025/0216922 A1    Jul. 3, 2025

(51) Int. Cl.
*G06F 1/3212* (2019.01)

(52) U.S. Cl.
CPC .................. *G06F 1/3212* (2013.01)

(58) Field of Classification Search
CPC ........ G06F 1/3212; G06F 1/32; G06F 1/3215; G06F 1/3206; G06F 1/3203; G06F 1/3228
See application file for complete search history.

(56) References Cited

U.S. PATENT DOCUMENTS 12,104,955 B2 * 10/2024 Soto .................. G06F 18/21
2020/0303938 A1 * 9/2020 Owen .................. H01M 10/44
(Continued)

FOREIGN PATENT DOCUMENTS

EP           3149502 B1 *  3/2020  ........ H04W 52/0261
WO    WO-2017091231 A1 *  6/2017  ........... G01R 31/367

OTHER PUBLICATIONS

Wan et al. "Multi-step time series forecasting on the temperature of lithium-ion batteries." J. Energy Storage 64 (2023).
(Continued)

*Primary Examiner* — Raymond N Phan
(74) *Attorney, Agent, or Firm* — Peter Zura; LOZA & LOZA, LLP

(57) ABSTRACT

Technologies and techniques for controlling an electrical system via battery forecasting for an electrical system. Time series data is transformed into a series of battery image data including a multi-channel image representing a plurality of battery characteristics and/or battery usage characteristics derived from the time series battery data. An image vector is generated for each respective battery image data of the series, and each image vector is transformed via a first portion of a transformer architecture for sequential data processing and positional encoding. Contextual information is extracted from the transformed image vectors, where each image vector is transformed via a second portion of the transformer architecture using learned weights from the first portion to generate a forecast of future battery characteristics and/or battery usage characteristics. A control command is generated for task-specific processing to modify operation of the electrical system, based on the forecast.

20 Claims, 10 Drawing Sheets

(56) References Cited

U.S. PATENT DOCUMENTS

| | | | | |
|---|---|---|---|---|
| 2021/0357402 | A1* | 11/2021 | Cheng | G06F 16/24568 |
| 2022/0115897 | A1* | 4/2022 | Ijaz | H01M 10/441 |
| 2022/0284747 | A1* | 9/2022 | Teo | G06N 3/084 |
| 2023/0194614 | A1* | 6/2023 | Negoita | G01R 31/396 |
| 2023/0291668 | A1* | 9/2023 | Valente | H04L 43/0864 |
| 2025/0052819 | A1* | 2/2025 | Li | G01R 31/396 |
| 2025/0209049 | A1* | 6/2025 | Zeng | G06F 16/221 |

OTHER PUBLICATIONS

Koohfar et al. "Prediction of Electric Vehicles Charging Demand:A Transformer-Based Deep Learning Approach." Sustainability 15 (2023). https://doi.org/10.3390/su15032105.

Huang et al. "MetaProbformer for Charging Load Probabilistic Forecasting of Electric Vehicle Charging Stations." IEEE Transactions on Intelligent Transportation Systems, vol. 4, No. 10 (Oct. 2023).

Hu et al. "Remaining useful life prediction of lithium-ion batteries based on wavelet denoising and transformer neural network." Frontiers in Energy Research. DOI 10.3389/fenrg.2022.969168. (Aug. 12, 2022).

Song et al. "A Remaining Useful Life Prediction Method for Lithium-ion Battery Based on Temporal Transformer Network." 4th Int'l Conf. on Industry 4.0 and Smart Manufacturing. Procedia Computer Science 217 (2023) 1830-1838.

Hannan et al. "Deep learning approach towards accurate state of charge estimation for lithium-ion batteries using self-supervised transformer model." Nature.com. Scientific Reports.https://doi.org/10.1038/s41598-021-98915-811:19541 (2021).

\* cited by examiner

FORECASTING TIMESERIES ANALYSIS FOR ELECTRICAL VEHICLE BATTERY STATE UTILIZING A HYBRID TRANSFORMER ARCHITECTURE

TECHNICAL FIELD

The present disclosure relates to forecasting time series analysis for electrical system, such as electrical vehicle (EV) battery usage utilizing Masked Embedding Models (MEM), based on a Bidirectional Encoder Representations from Transformers (BERT), and Generative Pre-trained Transformer (GPT).

BACKGROUND

Time series analysis involves solving various classification and regression tasks, as well as applying clustering techniques to understand hidden patterns in the data. By performing time series analysis, insights may be obtained relative to past trends, understanding seasonality, patterns and generate informed forecasts future performance. Generally, time series forecasting is directed to predicting the future as it is represented in some measurement as a function of time. Electric vehicle (EV) battery usage forecasting refers to the prediction of the amount of battery energy that will be consumed or used by an EV over a specific time period. Forecasting is important for predicting the battery remaining usable life, managing charging routines, optimal route planning, and others.

Recent advances in artificial technology and machine learning have improved the ability to forecast battery usage for vehicles. Current technologies have utilized deep learning networks to forecast (predict) battery status/usage using multi-step time series forecasting based on Transformer networks that use models to extract contextualized representations and perform leaning functions from those characteristics. However, current learning models have limited learning capabilities, and do not take advantage of large language models (LLMs) for predicting time series battery data. Furthermore, existing learning models are not configured to visualize embeddings trained from a Transformer network.

SUMMARY

The present disclosure addresses the aforementioned limitations in the prior art by introducing innovative and highly effective technologies and techniques for forecasting battery characteristics/usage utilizing a hybrid transformer architecture.

In some examples, a method is disclosed for controlling an electrical system via battery forecasting, comprising: transforming time series battery data into a series of battery image data comprising a multi-channel image representing a plurality of battery characteristics and/or battery usage characteristics derived from the time series battery data; generating an image vector for each respective battery image data of the series; transforming each image vector via a first portion of a transformer architecture for sequential data processing and positional encoding; extracting contextual information from the transformed image vectors; transforming each image vector via a second portion of the transformer architecture using learned weights from the first portion to generate a forecast of future battery characteristics and/or battery usage characteristics; and generating a control command for task-specific processing to modify operation of the electrical system, based on the forecast.

In some examples, an apparatus is disclosed for controlling an electrical system via battery forecasting, comprising: a processor; a communication circuit, operatively coupled to the processor; and a memory apparatus, operatively coupled to the processor, wherein the processor and memory are configured to transform time series battery data into a series of battery image data comprising a multi-channel image representing a plurality of battery characteristics and/or battery usage characteristics derived from the time series battery data; generate an image vector for each respective battery image data of the series; transform each image vector via a first portion of a transformer architecture for sequential data processing, and positional encoding; extract contextual information from the transformed image vectors; transform each image vector via a second portion of the transformer architecture using learned weights from the first portion to generate a forecast of future battery characteristics and/or battery usage characteristics; and generate a control command for task-specific processing to modify operation of the electrical system, based on the forecast.

In some examples, a method is disclosed for controlling an electrical system via battery forecasting, comprising: transforming time series battery data into a series of battery image data comprising an encoded multi-channel image representing a plurality of battery characteristics and/or battery usage characteristics derived from the time series battery data; generating an image vector for each respective battery image data of the series; transforming each image vector via a Masked Embedding Model (MEM) for sequential data processing and positional encoding; extracting contextual information from the transformed image vectors; transforming each image vector via a Generative Pre-trained Transformer (GPT) using learned weights from the first portion to generate a forecast of future battery characteristics and/or battery usage characteristics; and generating a control command for task-specific processing to modify operation of the electrical system, based on the forecast.

The detailed description and accompanying drawings that follow will provide an in-depth understanding of the inventive technologies and techniques for battery forecasting for an electrical system.

BRIEF DESCRIPTION OF THE FIGURES

The present invention is illustrated by way of example and not limitation in the figures of the accompanying drawings, in which like references indicate similar elements and in which.

DETAILED DESCRIPTION

Figure 1:
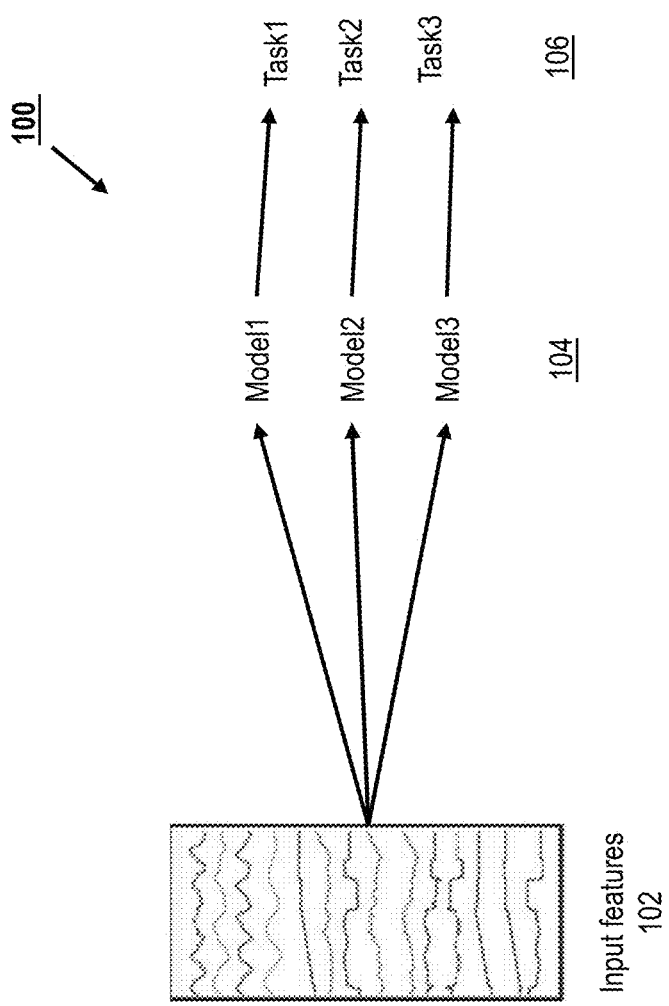
FIG. 1 shows an example of an operation of model training for machine learning systems, under the prior art.

The figures and descriptions provided herein may have been simplified to illustrate aspects that are relevant for a clear understanding of the herein described devices, structures, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

The present disclosure illustrates examples for building a generalized framework to address problems in time series battery data forecasting. These problems include issues with clustering analysis, classification and regression tasks, and missing data filling. Clustering is useful when grouping unlabeled battery usage data to unveil hidden insights. For example, one can group battery data based on driving and charging behavior. When labels are available, one can perform a classification task. Classification is useful when categorizing battery usage into different states like charging state or driving usage, while regression is useful when predicting a continuous value related to the battery usage such as battery capacity, remaining charge, and estimated runtime. Furthermore, many optimization routines involve taking an action in the present moment to achieve a desired outcome in the future. These typically require some estimation of what the future usage will entail. Such routines can prompt a user for their intentions, but the most user-friendly routines will estimate it based on past usage. In the case of estimating remaining usable life of a battery, assumptions must be made about future usage and the more accurate assumptions are, the more useful the estimates are. Moreover, when there is missing data due to corruption or communication issues, the masked algorithms disclosed herein can estimate the values between two endpoints and fill it in (backfilling missing data).

To perform EV battery usage forecasting, various methods can be employed, including statistical models, machine learning algorithms, and other approaches. These methods typically utilize historical battery data, driving patterns, environmental conditions, and other relevant factors to make accurate predictions about future battery usage. Accurate EV battery usage forecasting has several benefits, including improving range anxiety by providing drivers with reliable range estimates, optimizing charging infrastructure utilization, and enabling effective energy management strategies to extend battery life and improve overall efficiency.

The present disclosure focuses on building a generalized modeling framework for EVs time series battery usage leveraging state-of-the-art large language models (LLMs) such as MEM, based on BERT architectures, in combination with GPT. The data is configured in a time series format with regular time intervals (e.g., daily, weekly, monthly, etc.). The data for the selected regular time interval are transformed into an image and then embedded/tokenized using CNN-based autoencoder. The extracted tokens/embeddings are then input to LLMs. A pre-trained image Transformer model/masked embedding model (MEM) inspired from BERT is utilized as a general model for extracting the contextualized embeddings from the tokens generated with the autoencoder. In some examples, MEM can be used for various tasks, such as pre-training BERT or a Vision transformer (image transformer) or train an entire MEM model, as well as various downstream tasks such as classification, regression, clustering, missing data filling, 1-day ahead forecasting, and so-forth. GPT may be used for forecasting 7-days ahead downstream tasks to forecast battery usage such as SoC, mileage driven and if vehicle was at home or not. To speed up training and achieve better accuracy in forecasting, a pre-trained MEM/BERT model may be utilized to transfer learning between MEM/BERT and GPT when performing the forecasting downstream task(s).

Turning to FIG. 1, the drawing shows an example 100 of an operation of model training for machine learning systems, under the prior art. Here, input features 102 (e.g., sensor data) may be used to train a plurality of models 104 (Model1, Model2, Model3), respectively configured for preforming a plurality of tasks 106 (Task1, Task2, Task3) using the same dataset. Under such a configuration, unnecessary computation and memory is utilized, causing excessive waste in computational power and system resources.

Figure 2:
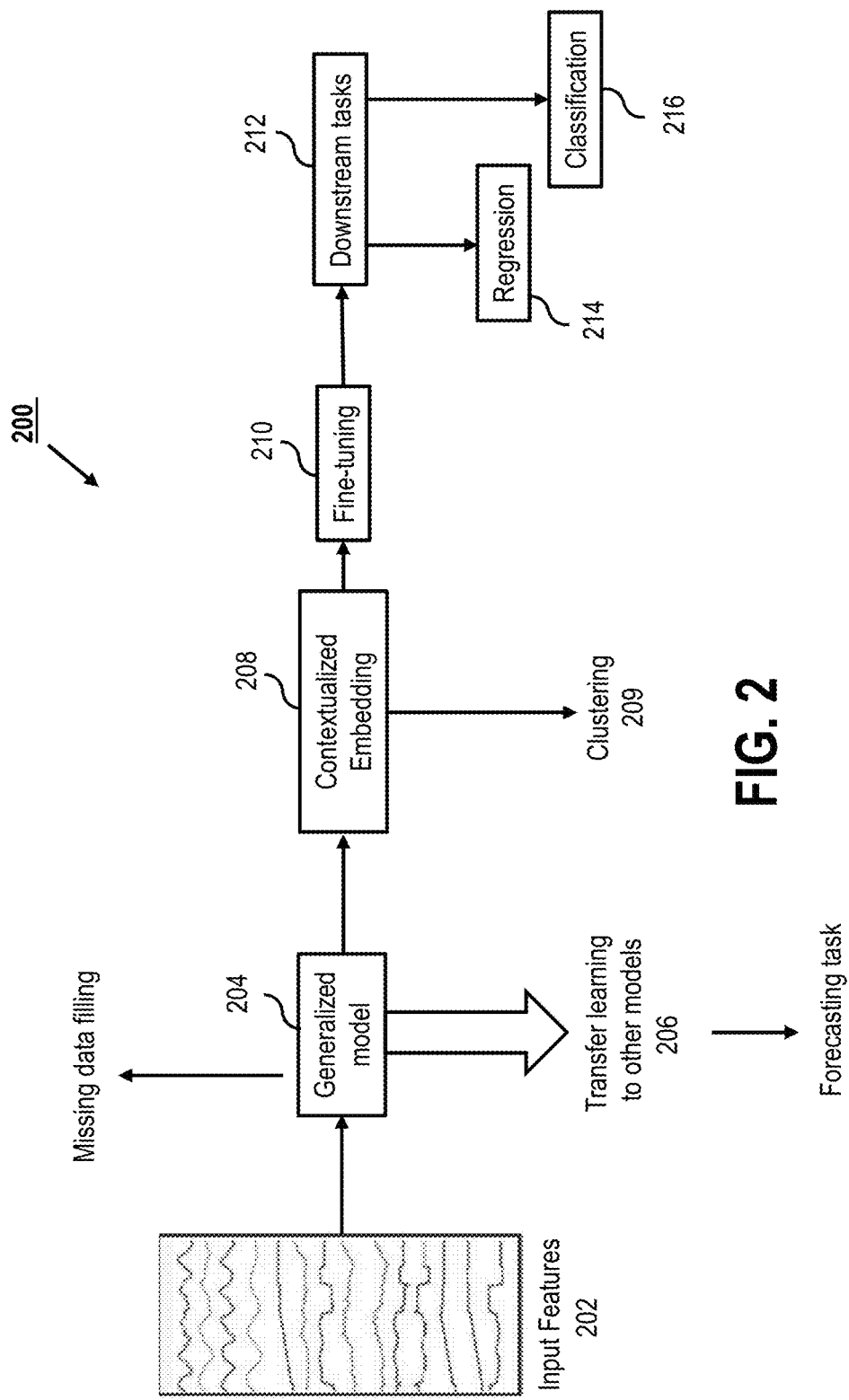
FIG. 2 shows an example of model generalization for a machine learning system, according to some aspects of the present disclosure.

FIG. 2 shows an example 200 of model generalization for a machine learning system, according to some aspects of the present disclosure. In this example, input features 202 are pre-processed (e.g., Grey Scale encoding, Autoencoder) and used as input for generalized model 204. A generalized model, such as those used for contextualized embeddings (208) refers to models capable of generating embeddings (numerical representations) for data that capture their contextual meaning within a given context, and further be utilized for transferring the pre-train weights of MEM (204) into another model (e.g., GPT). The generalized model may then be utilized for models within Transformers in 206, in order to transfer learning. In some examples, the generalized model 204 provides contextualized embeddings 208 further used by clustering in 209 and by downstream tasks 212 through fine-tuning 210.

In some examples, the MEM is configured to output contextualized embeddings 208 which are useful for clustering analysis 209 and it can be fine-tuned (210) for downstream tasks (212) including classification (216) and regression (214) MEM and BERT share similarities in their fundamental approach to learning contextualized representations from data, via contextualized representations, masked model training, and Transformer architecture. MEM is a more generic term referring to models that use masking techniques to learn embeddings, while BERT specifically refers to a pre-trained model. In some examples described below, examples are provided using MEM, but it is understood that pre-trained BERT models (as well as other Transformer architecture models like vision transformer and time-series transformer) may be substituted in some instances. As discussed herein, the disclosed MEM configurations are inspired by BERT in the way models are trained by masking some of the inputs, or embedding and letting the model predict the masks. Instead of masking word embeddings (BERT), the present disclosure masks time-series embedding. The overall architecture of MEM and BERT is substantially similar, but the MEM is configured to have less complexity (e.g., layers, embedding dimension, parameters) to speed up the training and inferencing process. The disclosed configurations may also leverage a pre-trained BERT as well, since it utilizes a similar architecture, but with more layers and complexity (embedding dimension).

The input features 202 may include various kinds of data relating to a battery state, including, but not limited to a state of charge (SoC), state of health (SoH), mileage, temperature, voltage, current, internal resistance, cycle count, charging/discharging rates, and location ("home"). The input features 202 may be preprocessed (by Grey Scale Encoding and Auto encoder) as inputs to a generalized model (MEM), where knowledge from the model (MEM) can be transferred to other learning models 206 via transfer learning. Clustering analysis may be performed from contextualized embedding, where the contextualized embedding is the output of MEM as a result of learning the masked embedding task (e.g., by estimating the masks given the surrounding context. Thus, the contextualized embedding may be considered context awareness in that the analysis contains information of the context or surrounding. Contextualized embedding 208 and clustering 209 may be performed where features may be generated from the battery's characteristics (voltage, current, temperature, SoC, mileage, location, etc.). These features may be considered a part of the "context" for the battery state. In some examples, tokenization and encoding may be used to convert representations of battery data into embeddings after extracting subsequences from the long timeseries data. The subsequences may be tokenized to obtain contextualized embeddings of sequences of these battery features from the respective models.

In block 210, the machine learning system of 200 may perform fine-tuning of the data from block 208 to achieve contextualized embedding or the output of MEM. The contextualized embedding from MEM is well-trained in a sense that it represents inputs (battery time-series data) accurately, and fine-tuning is achieved easily. In some examples, the fine tuning 210 may load a pre-trained model's weights and architecture that include parameters that already encode extensive knowledge of the context from the pre-training process. The model's output layer may be modified, or additional layers may be added on top of the pre-trained model to adapt it to the specific task of predicting battery states. The fine-tuning objective may also be configured to one or more objectives for downstream tasks 212 involving classification (216) and regression (214). The learning (in 206) may be transferred from MEM to GPT for subsequent forecasting. Gradients may be backpropagated through the added or modified layers while keeping the majority of the pre-trained weights frozen or allowing minimal changes in them. In some examples, the fine-tuning may iterate through epochs, while adjusting the model's parameters to minimize the task-specific loss function.

The output from fine-tuning the model in 210 may be further processed for downstream tasks 212, including regression 214 and classification 216. The MEM produces contextualized embeddings, and these contextualized embeddings are used as input to one or more other models which will perform the downstream tasks. These models may be trained using transfer learning process from MEM rather than being trained from scratch. In some examples, the regression 214 may perform regression tasks related to battery characteristics, such as driving range performance, state of health or a health index of the battery, etc. The contextualized embeddings may be fed into a regression model such as a feedforward neural network, recurrent neural network (RNN), transformer, Long Short-Term Memory (LSTM), or a gradient boosting regressor. The regression model learns from the contextualized embeddings to predict a continuous output, such as the remaining capacity, degradation rate, or future state of the battery. Similarly, for classification 216, contextualized embeddings may be generated for battery data using the fine-tuned model from 210, and embeddings may be used as features for the classification model to define classes representing different battery states. In some examples, the contextualized embedding from MEM is fixed, and is not retrained. The fine-tuning process may train a separate model from the beginning using the contextualized embedding as inputs to map them to desired outputs (classification and regression). The classification model may be trained using the embeddings as input features and the labeled battery states as target classes, where the classification model's performance may be evaluated using metrics like accuracy, precision, recall, and F1-score to gauge its ability to classify the battery into the correct state.

Figure 3:
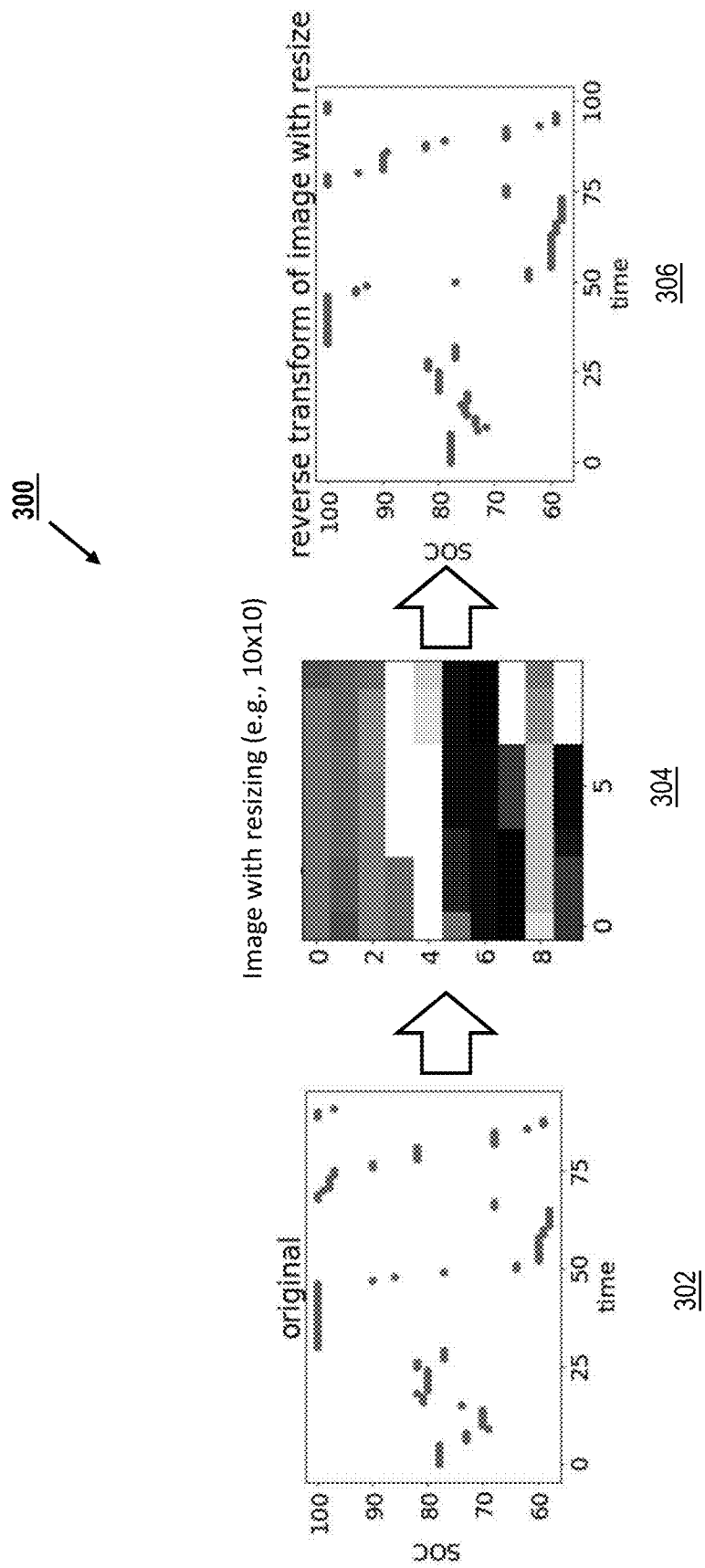
FIG. 3 illustrates an example of transforming time series data battery image data utilizing Grey Scale Encoding, according to some aspects of the present disclosure.

It should be understood by a person having ordinary skill in the art that using a generalized model as disclosed herein has a number of advantages, such as missing data filling. By training the model once, the weights can be transferred to other models, and meaningful outputs or embeddings can be clustered to find insights. The embedding may also be fine-tune for downstream tasks including classification and regression. Generally, fine-tuning for downstream tasks in such a configuration is fast, relatively easy to train, and doesn't require excessive computation for achieving accurate results, because the represented contextualized embedding is learned by MEM FIG. 3 illustrates an example 300 of transforming time series data into images utilizing Grey Scale Encoding, according to some aspects of the present disclosure. In some examples, raw time series values for a battery characteristic shown in plot 302 may be expressed as a grey scale image 304 which can be resized to a desired larger or smaller size (e.g., 10×10) using interpolation techniques like bilinear, nearest neighbor, cubic, or other suitable technique shown in 304. This reduces (or increases) the image's dimensions while attempting to preserve the important features and information about the battery characteristics, such as state of charge. The images may be represented as a single channel representing the intensity of each pixel, where shades of gray indicate different levels of intensity or, in this case, different levels of state of charge, for example. The resized image from 304 may then be reverse transformed in 306 using, for example, a reverse transform of grey scale encoding according to the grey scale encoding equation, to restore the image dimensions to its initial state (302) to produce a differently-sized representation of the original image 302. Thus, as an example, a raw time-series (302) may have a configured length (81). Grey Scale encoding is used to transform the raw time series into 9×9 image and resize it with interpolation method into a 10×10 image (304). Then, reverse transform is used according to the grey scale encoding equation to transform the image of 304 (10×10) into raw time-series (which is now 100 length instead of the original 81 length). The algorithm illustrated in 300 may be configured to normalize the time series and reshapes from 1D to 2D array or matrix and this process is reversible. Images can be resized easily with, for example, an OpenCV library. The original and the reverse raw time series will be very similar but with different length.

One of the advantages of using images instead of resampling raw time series data is that the image representations are capable of handling data of unequal length such as battery cycles (e.g., battery cycles which varies between 3 to 14 days), and image resizing algorithms may be effective to ensure a same size of all images. It further allows for a compact representation of the data. In some examples, each image may be a representation of data for one day, meaning that many data point may be processed simultaneously. Processing image data also allows the system to handle very long input sequences (e.g., BERT may be configured up to 512 input tokens). This compacts long raw-time-series into a single image (e.g., 1 day=1 input token), instead of requiring many input tokens for 1 day. Furthermore, techniques such as Grayscale encoding allows the representation of the SoC image to be reproduced in a simplified manner, making it easier to visualize and analyze different levels of data. The resizing and encoding to grayscale reduce the computational load or memory requirements while retaining essential information about battery state. As shown in the figure, each feature may be transformed into a two-dimensional (2D) matrix and concatenated together as a color channel image, with the number of channels representing the number of features.

Figure 4:
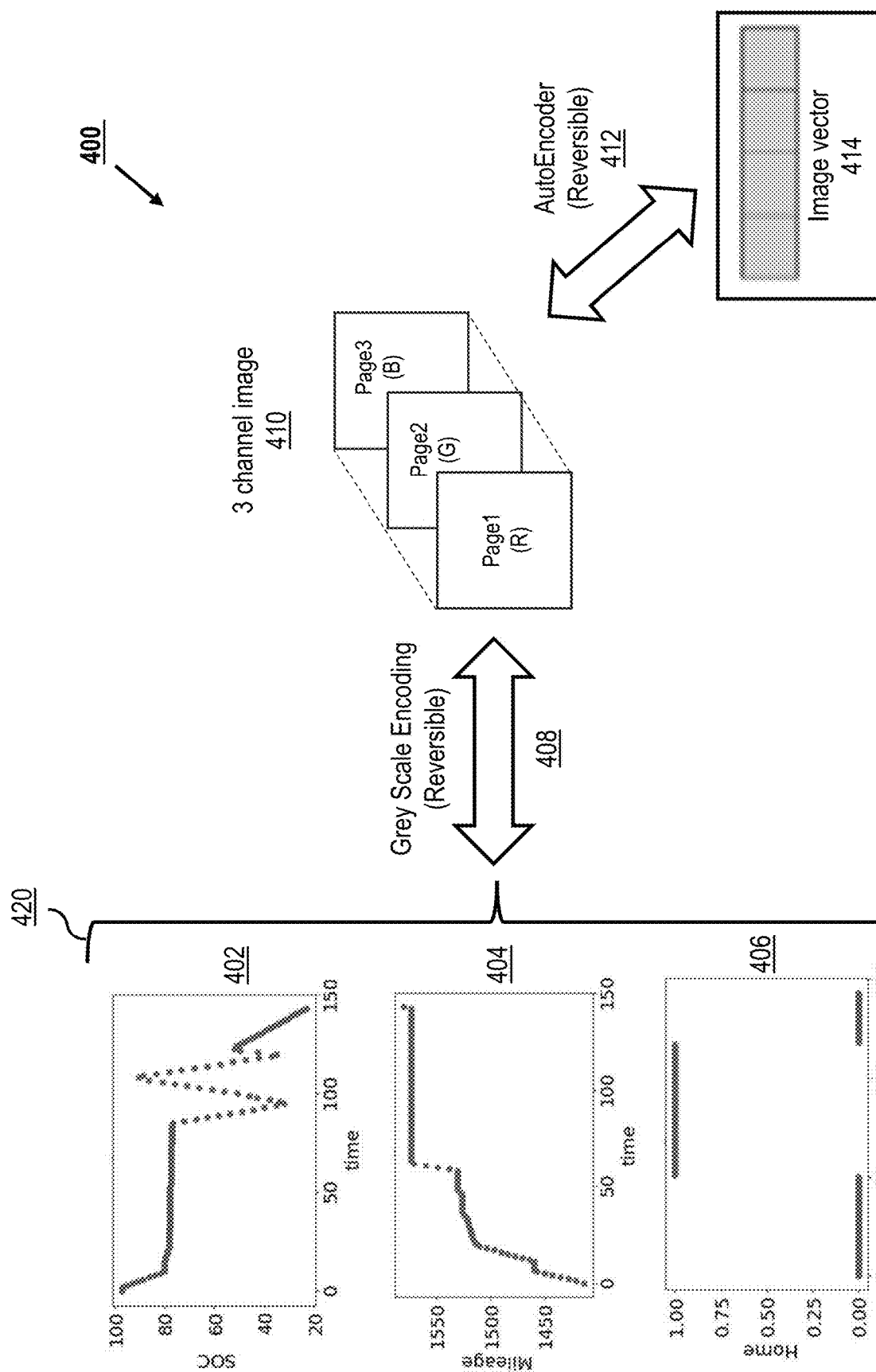
FIG. 4 illustrates an example of time series input representation and autoencoding to produce an image vector, according to some aspects of the present disclosure.

FIG. 4 illustrates an example 400 of time series input representation and Autoencoder to produce an image vector, according to some aspects of the present disclosure. In this example, time series images of a plurality of battery characteristics SoC 402, milage 404 and home 406 are combined 420 into a three-channel image 410 using Grey-scale encoding 408 with the number of image channel being configured to correspond to the number of features. The Grey-Scale encoding may be configured to transform time series into 2D arrays or matrices and concatenated them together to generate the 3-channel image. In this example the SoC 402 represents the percentage charge of the battery which may fluctuate between 0 to 100, mileage 404 (i.e., mileage on the vehicle), and home 406, which may be a binary value of either 0 or 1, with "O" means charging not at home, and "1" meaning charging at home. The three-channel image may then be processed using an artificial neural network, such as autoencoder, to generate an image vector to represent the time-series data (3 features).

The autoencoder may be configured for unsupervised learning and dimensionality reduction, where, in some examples, one or more encoders receives the image input data and compresses it into a lower-dimensional representation, known as "latent space" or "encoding," or "image vector". The compressed representation captures essential features or patterns in the input data. The compressed representation should be configured to retain meaningful information while removing noise or unnecessary details. A decoder may take the compressed representation from the latent space and reconstructs the original input data. The decoder network attempts to generate output data that closely resembles the initial input. The autoencoder may be trained to minimize the difference between the input data and the reconstructed output. By doing so, it learns to capture features of interest of the data in the compressed latent space. After autoencoding, the three-channel image may be represented as a single image vector 414. As the process of 400 is reversible because of the compact representation of the image vector or latent vector from Autoencoder, data complexity may be substantially reduced. As an example, assuming that the combined images 420 represent 432 time series data points (144×3), the reversible encoding would result in an image vector of approximately 50 dimensions, thus reducing the memory and data complexity by 88%. Thus, during operation, the forecasting system may collect sequences of multi-feature time series (e.g., three-channel image 410) for a configured period of time (e.g., 1 day, 1 week), where each collected time series may be simplified into a respective sequence of image vectors (e.g., vector1=day1, vector2=day2, vector3=day3, etc.). These vectors may then be used to forecast future vectors accurately, using reduced memory and data complexity. In some examples, the data collected should be larger (e.g., at least 2-3×) than the period for forecasting. For example, data relating to past battery usage and/or battery characteristics may be collected and processed for a 28-day period for a 7-day forecast.

Figure 5:
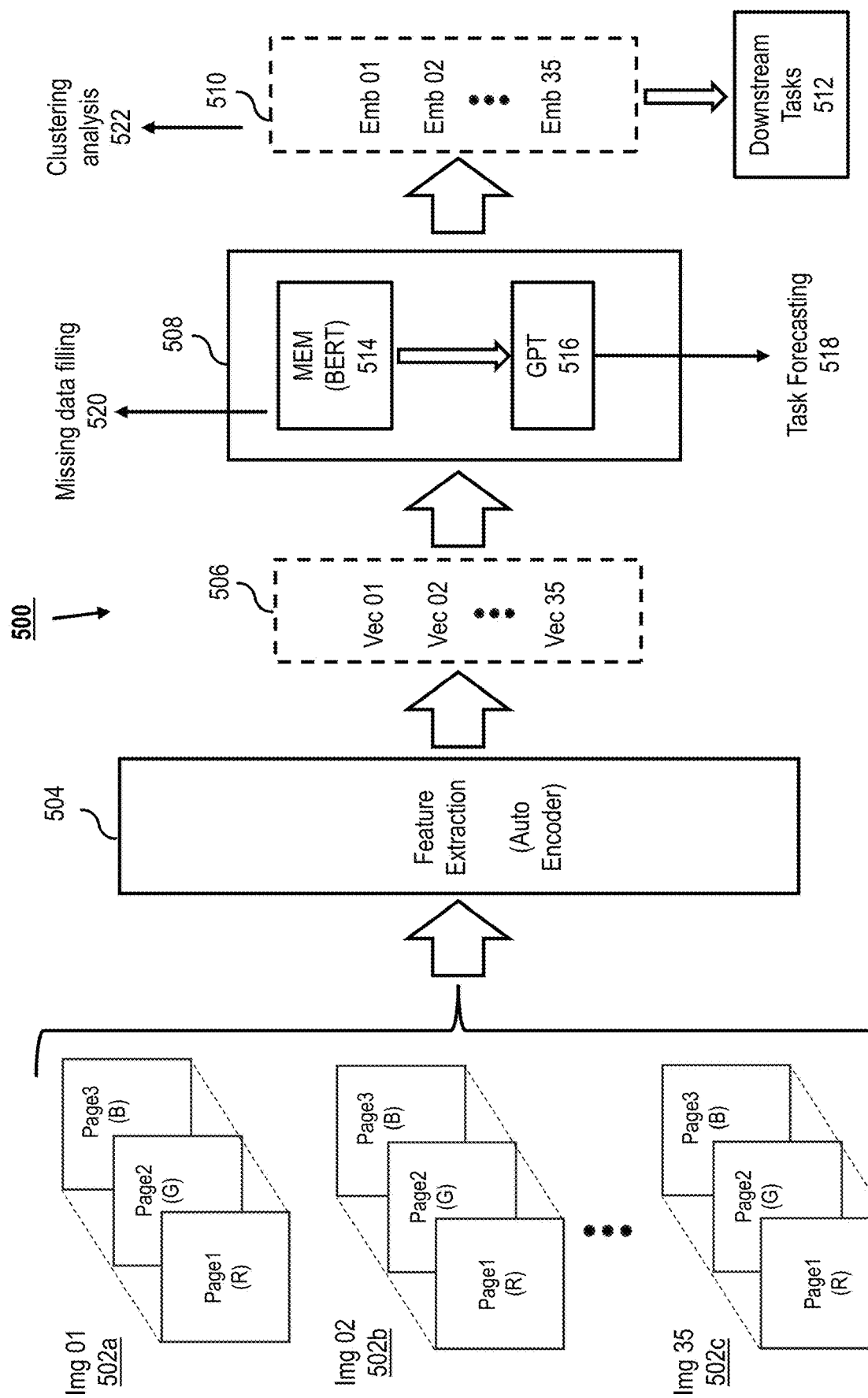
FIG. 5 illustrates an example of a generalized framework for time series forecasting utilizing a temporal encoder, according to some aspects of the present disclosure.

FIG. 5 illustrates an example 500 of a generalized framework for time series forecasting utilizing a temporal encoder, according to some aspects of the present disclosure. Similar to the examples above, a plurality of time series images (502a-502c) relating to battery characteristics are subjected to feature extraction via autoencoder 504 and transformed into respective image vectors 506. The image vectors 506 may then be input into a transformer architecture 508 directly to MEM 514 for sequential data processing, sequence generation and processing the image vectors 506 via positional encoding. The MEM 514 may convert inputs into embeddings, which may be configured as numerical representations capturing contextual information. The images may be represented as a sequence of vectors, where each vector could correspond to 1 image of 1 day time-series data. The positional encoding may be configured to inject information about the positions of elements in the sequence, where the spatial information of the vectors may be determined within the image.

In some examples, the MEM 514 may include an encoder architecture, where the encoder processes the input sequence, and the decoder generates the output sequence based on the encoded information. This structure allows the model to learn and generate sequences based on the contextual information provided by the embeddings and positional encodings. The MEM 514 may also include a self-attention mechanism to enable the model to weigh different parts of the input sequence while processing it to help capture dependencies between different elements in the sequence, such as vectors representing parts of an image, and contextualized embedding may include a mixture of all input images. In some examples, the MEM 514 may also be configured with convolutional neural networks (CNNs) that are specifically designed to retain spatial information. A hybrid model that combines elements of MEMs and CNNs may be more effective for tasks that demand understanding both sequential and spatial aspects of images. The output of MEM may provide contextualized embedding 510 that encode information about the image's content and spatial layout which may be fine-tune for downstream tasks 512. In some examples, MEM is used for missing data filling 520, while contextualized embedding 510 is used for clustering analysis 522 to find insights.

As can be seen in the figure, a GPT 516 may be also incorporated to integrate with the MEM 514 to create a hybrid architecture that fuses the strengths of both models. In some examples, the MEM (or BERT) 514 model is employed to process image vectors, where image data is transformed into sequences of vectors representing 1-day time series data. The autoencoder may capture spatial relationships between different parts of the image, while the MEM 514 extracts contextual information from these image vectors, capturing temporal relationships from input images. MEM 514 also learns spatial information from each image as well with the Query (Q), Key (K), and Value (V) linear layers of a Transformer-based attention mechanism. In some examples, these embeddings carry information about the image in a format that's been processed and understood by the MEM 514 model. GPT 516 may be configured with the same layers as MEM 514, where the weights learned after training MEM 514 may be transferred into GPT 516 and using image vectors 506 as input into the GPT 516 architecture along with masking (e.g., self-attention mask) to solve forecasting tasks 518.

Figure 6:
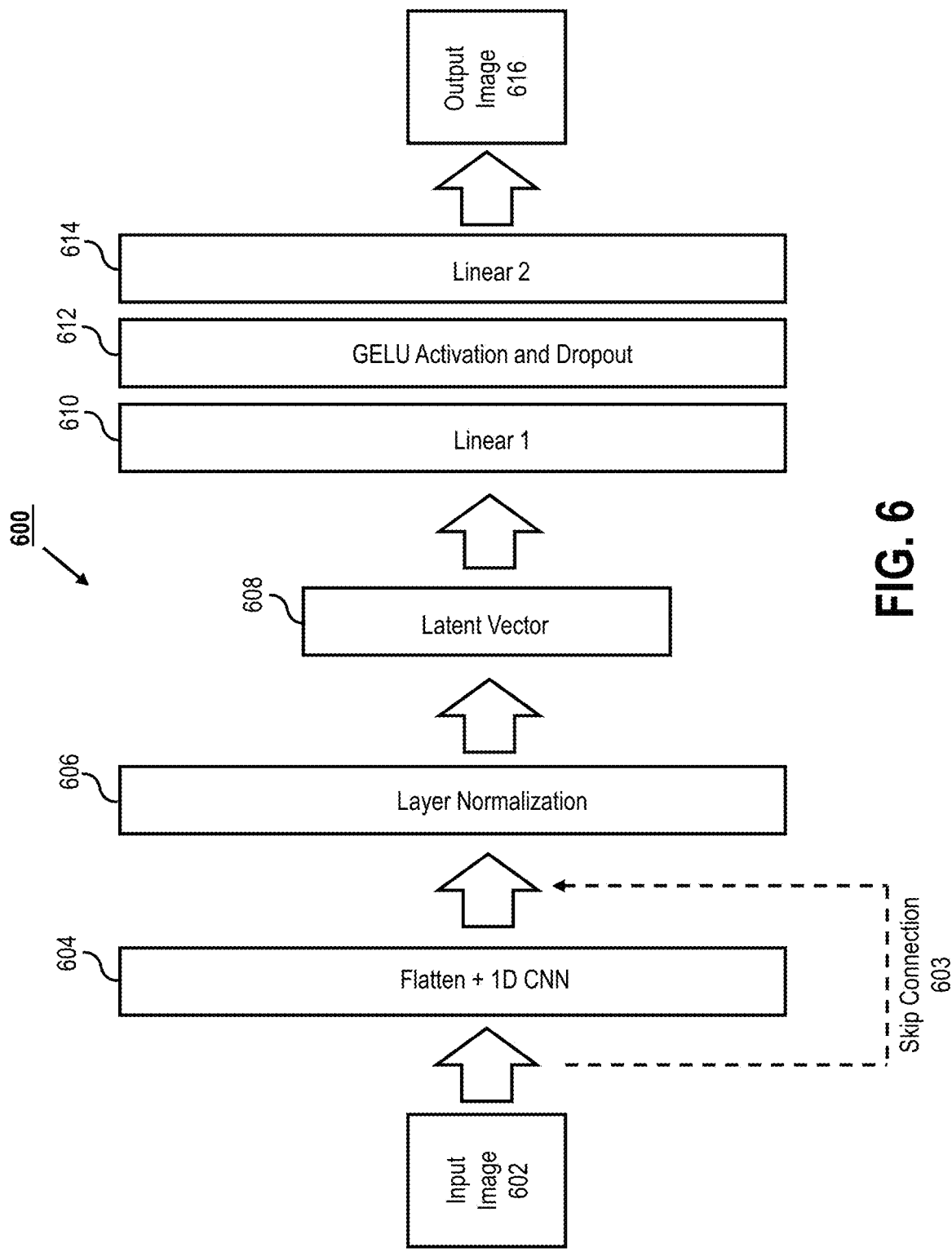
FIG. 6 illustrates an example of an auto-encoder architecture for processing input images, according to some aspects of the present disclosure.

FIG. 6 illustrates an example of an auto-encoder architecture 600 for processing input images, according to some aspects of the present disclosure. As can be seen in the example, an input image 602, similar a time series image (502a-502c) discussed above, is flattened and processed in a 1D Convolutional Neural Network (CNN) 604. While 2D CNNs or pre-trained CNN architectures like ResNet could also be used, the characteristics of time series image data may perform better under a 1D CNN. In some examples, a skip connection 606 may be provided to bypass one or more layers in a neural network to mitigate the potential issues of vanishing or exploding gradients during training. Layer normalization may also be applied in 606 to normalize the output vectors from each layer, helping to stabilize and improve the training process.

In block 608 latent vectors or image vectors are derived, producing a compressed and informative representation of the input image. After passing through the layers of the 1D CNN 604 with skip connections 603 and normalization 606, the model may extract latent vectors as desired outputs from the network. This extracted latent vector serves may then be input to a feed-forward layer, including, but not limited to a linear layer 610, Gaussian Error Linear Unit (GELU) 612 and a second linear layer 614. The feed-forward layer takes the latent vector and processes it to generate an output image used to reconstruct the original input image (602).

The GELU of 612 may be configured as an activation function for the neural networks, and may be utilized to enhance learning capability of non-linear relationships and improve model performance. The dropout of GELU 612 may be utilized to minimize the impact of overfitting when training the model. Generally, GELU 612 is a smooth approximation of the rectified linear unit (ReLU) and may be used as an alternative activation function. The GELU 612 introduces non-linearity to the network by applying a non-linear transformation to the output of a linear layer. The AI network may also include dropout as regularization to prevent overfitting by, e.g., randomly setting a fraction of the input units to zero during each training iteration. The purpose of dropout is to reduce the reliance of the model on specific neurons, thus improving generalization and robustness. Dropout between layers (610, 614) helps prevent co-adaptation of neurons and enhances the network's ability to learn more robust and generalizable representations.

The linear layers 610, 614 may be configured as fully connected layers to transform the data and learn higher-level representations. Applying GELU 612 activation after the first linear layer 610 introduces non-linearity to the transformed features, potentially enabling the model to learn more complex patterns. The configuration may enhance a model's capacity to learn and generalize from the latent representations. The GELU activation and dropout ensures that the model doesn't overly rely on specific learned features, thereby improving its ability to generate more robust and generalizable output images 616 during training. Furthermore, the auto-encoder architecture 600 improves unsupervised learning where a model may be trained without explicit labels, allowing for models to be trained such that the output image 616 matches the input image 602 by reconstructing or outputting an image representing battery data that resembles the input image, creating a form of self-supervision where the model learns to generate outputs that are similar to its inputs.

Figure 7:
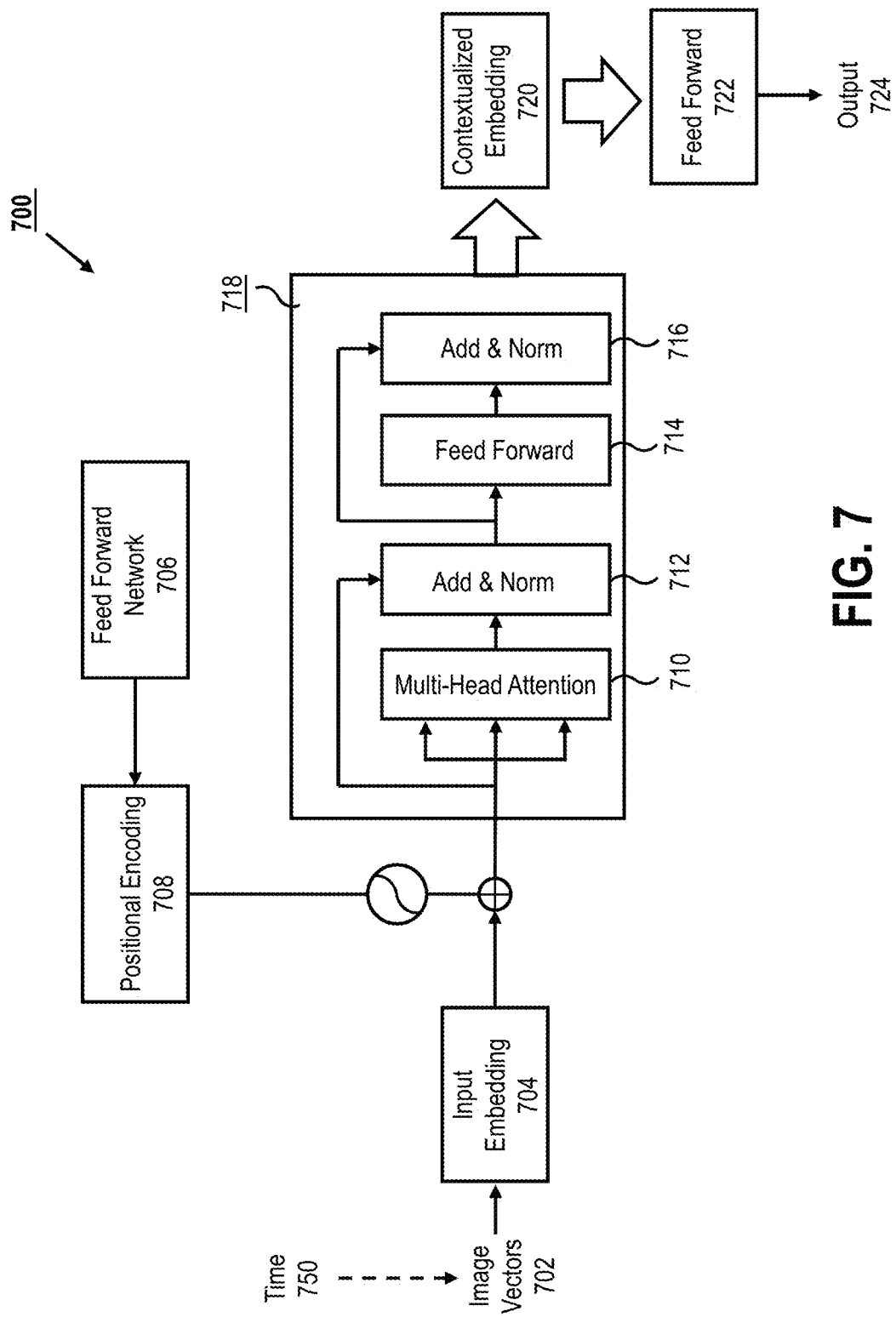
FIG. 7 illustrates a Masked Embedding Mode architecture and Transformer for forecasting a vehicle battery state using learnable positional encoding and contextual embedding, according to some aspects of the present disclosure.

FIG. 7 illustrates a MEM architecture 700 and Transformer for forecasting a vehicle battery state using learnable positional encoding and contextual embedding, according to some aspects of the present disclosure. In this example, the reliance on RNNs and their hidden states are replaced with attention-based operations that are more efficient in many problem regimes, including time series data. In doing so, the Transformer architecture eliminates a significant bottleneck in the training process for models, and makes large models trained on large datasets feasible to implement. In this example, the architecture 700 ingests a configured number (e.g., 35) image vectors 702, each encapsulating battery parameters of interest. Supplementing these vectors is an additional feature, relating to configured time periods (e.g., "Monday_to_Sunday") offering a numerical representation (e.g., ranging from 0 to 6, mapping to Monday through Sunday). This feature augments the temporal context (as well as spatial information) within the battery data. In one example, the input dimension includes the vectors (e.g., 50 dimensions or "dim") plus the supplemental data (704; e.g., 50+1)

Using input embedding 704, temporal context may be incorporated via positional encoding 708. Before model processing, temporal data integration occurs. A learnable positional encoding 708, is derived, for example, from a feed-forward network 706 (such as 610-614) including the Day, Month, and Year attributes associated with the target image vector. This encoding injects temporal cues into the battery data, facilitating the model's grasp of temporal variations and patterns.

The Transformer module 718 may be configured to utilize a Multi-Attention Head mechanism 710, which is advantageous for handling the image vectors. The Multi-Attention Head 710 further enables parallelized processing of sequences within the battery data, enabling extraction of information from various segments of the input. This capability is useful in comprehensively capturing diverse temporal and spatial relationships inherent in the data.

Following the Multi-Attention Head, a Fully Connected Layer integrated with Gaussian Error Linear Unit (GeLu) activations engages. This layer processes sequence elements concurrently, introducing non-linearity to extract deeper insights from the battery data. Notably, an "add & norm" layer 712, 716 configuration (skip connection and normalization layer) enhances both the Multi-Attention Head 710 and the subsequent Feed-Forward Network 714, optimizing their functionalities and fostering robust model performance.

Post-Transformer processing directs the transformed data into a Feed-Forward Network 722. This network orchestrates a dimensional shift (e.g., from 51 to 50), extracting contextualized embeddings in 720 from the processed input. These embeddings encapsulate rich contextual information useful for forecasting battery usage patterns and characteristics. The introduction of positional encoding, derived from temporal attributes, infuses the battery data with temporal context. It enables the model to discern temporal patterns and variations, complementing the spatial understanding derived from image vectors. The encoding facilitates the network's ability to differentiate and understand the sequential order and relationships within the battery data, enhancing the overall functionality.

During training, the input sequences $\vec{F}=(f_0, f_1 \ldots f_n)$ are passed into a first encoder block all at once, and the output of that block may then be passed through a successor encoder block. The process is repeated until all N encoding blocks have processed the input, where a current encoder processes the data from the previous encoder. As mentioned above, each block may be configured with a Multi-Head Self-Attention layer, followed by a fully connected layer with GeLU activations that processes each element of the input sequence in parallel. When the input has passed through all the encoding blocks, the encoded representation of $\vec{F}$ is generated. Both the multi-head attention layer and the fully connected layer are followed by an "add & norm" step, where the "add" refers to a residual connection that adds the input of each layer to the output, and the "norm" refers to "Layer Normalization."

The training objective of MEM in the disclosed configurations is similar to BERT which is an unsupervised learning by guessing the mask given the surrounding context. In some examples, the loss is computed only at the mask position, not the entire sequence. The dataset used to train MEM is the image vectors from Autoencoder with an additional time feature (e.g., "Monday to Sunday") and learnable positional encoding from the day, month, and year of the target image vector.

Figure 8:
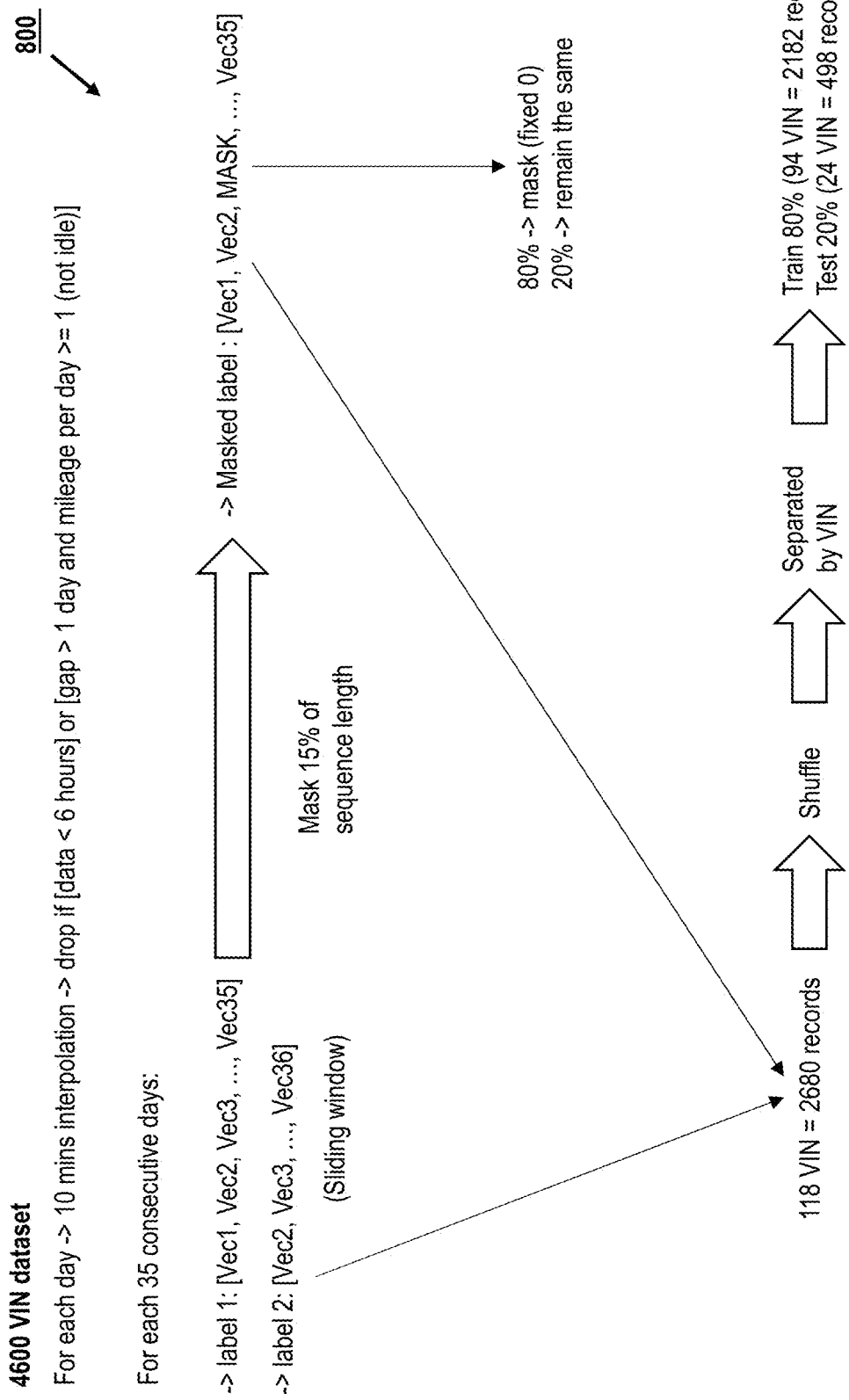
FIG. 8 discloses an example of data preparation for MEM according to some aspects of the present disclosure.

FIG. 8 discloses an example of data preparation 800 for MEM according to some aspects of the present disclosure. The data preparation process involves cleansing and processing battery-related data by addressing missing values, selecting sequential records, generating sequences and labels, randomly masking data for training robustness, and splitting the dataset for training and testing to evaluate the model's performance across different vehicle identification numbers. The aim is to create a well-structured dataset that enables the MEM model to learn patterns and behaviors associated with battery usage and characteristics.

The initial step as shown in the figure involves performing interpolation over a configured period of time (10 minutes) to address missing data within each day's records. In some examples, a plurality of conditions may be set to determine record exclusion. One condition may be if available data for a particular record is less than 6 hours. Another condition may be if there's missing data for more than 1 day, and the corresponding daily mileage is equal to or greater than 1. Records meeting these exclusion criteria are dropped from the dataset.

Next, a selection of a configured period of time (e.g., 35 consecutive days) is performed using a sliding window. This process may involve iteratively choosing 35 days of records, sliding through the dataset to generate sequential sequences. Sequences and corresponding labels are generated based on the chosen 35-day sequences, representing specific characteristics or outcomes related to the battery data. Subsequently, 15% or 5 days within the generated sequences are randomly selected for masking. As can be seen from the figure, there's an 80% probability of replacing the selected days with a zero vector (indicating missing or masked data), while 20% of the days remain unchanged.

In this example, the dataset comprises 118 vehicle identification numbers (vin), totaling 2680 records or sequences. To ensure model evaluation, the dataset is shuffled and divided by vin into an 80% training set and a 20% testing set. The assumption is that the model's performance on the seen vin (training set) will generalize well to unseen vin (testing set).

One example of a MEM training configuration may be expressed as follows:
  Dataset: Train 80% (27115 images), Test 20% (6789 images) #10% randomly from the entire dataset
  batch size=256

Image vector dimension: 50
Activation function: Gelu ( )
Drop out probability: 0.1
Loss=(5*Loss_SOC+2*Loss_Mileage+Loss_Home)/(8)
Loss_SOC and Loss_Mileage=MAE loss, Loss_Home=BCE loss optimizer=torch.optim.AdamW (lr=1e-3, amsgrad=True)
Epoch=300
Early stop threshold=100
Total Params: 1,159,964
Trainable params: 1,159,964
Non-trainable parameters: 0
Total mult-adds (G): 2.15
= = =
Input size (MB): 0.44
Forward/Backward pass size (MB): 146.73
Params size (MB): 2.19
Estimated Total Size (MB: 149.35
= = =

Regarding the training configuration, the more important settings include the dimension of a transformer, which, in this example is 51 (50+1), the number of multi-attention heads is 17, the number of encoder layers is 3, the dropout probability is 10%, the activation function is Gaussian Error Linear Unit (GeLu), the loss function is a mean absolute error for comparing the label vectors and the predicted vectors, and the total model's parameters are around 200 k.

Regarding downstream tasks of MEM relating to contextualized embedded clustering, these tasks may include a variety of techniques including, but not limited to, K-Means, Affinity Propagation, Mean-Shift, Spectral Clustering, Ward hierarchical Clustering, Agglomerative Clustering, Density-Based Spatial Clustering of Applications with Noise (DB-SCAN), Hierarchical Density-Based Spatial Clustering of Applications with Noise (HDBSCAN), Ordering Points to Identify the Clustering Structure (OPTICS), Gaussian Mixtures, Balanced Iterative Reducing and Clustering using Hierarchies (BIRCH) and Bisecting K-Means. These techniques may be utilized to find the cluster segmentation of the battery usage data. These clusters can be further coupled with forecasting (e.g., GPT or MEM), i.e. by training a separate forecasting model for each cluster in order to improve forecasting accuracy compared with when training one forecasting model for all the clusters. For example, one can forecast Soc, mileage driven, location, driving range performance (total distance/total discharge), battery SoH to track battery degradation, among others. Classification may also be applied to produce local embedding classification and global or sequence embedding classification.

Similarly, regression may be used for downstream MEM tasks to extract numerical values or representations ("float") from the embeddings. Contextualized embeddings are vector representations of data generated by models like BERT, or similar architectures. These embeddings capture rich semantic and contextual information rather than explicit numerical values. While contextualized embeddings are primarily designed to encode contextual and semantic information, they might indirectly encapsulate numerical details. Identifying numerical information within contextualized embeddings would involve analyzing the context in which these embeddings are generated. Analyzing the context in which these embeddings occur may reveal patterns associated with numerical information. For instance, embeddings occurring in contexts discussing measurements, quantities, percentages, or specific numeric references might imply the presence of numerical data.

A regression model may be configured to learns patterns and relationships between input variables and a continuous numeric outcome, where training data containing known input-output pairs may be used to fit the regression model. The model learns the relationships between the input variables and the numeric output. Once the model is trained and validated, it can be used to predict or estimate the numeric value ("float") for new or unseen input data. The regression model applies the learned relationships to the new input variables to generate predictions of the continuous outcome. Regression downstream tasks can also be used for driving range performance, as well as electricity cost estimation, batter SoH estimation, and remaining mileage/runtime estimation, among others. Forecasting may be done by, for example, masking the last n days, and allowing the model to estimate the masks. Alternately or in addition, the MEM may be trained with fine-tuning, with only the last n masks to achieve better accuracy, rather than random masks. Also, as discussed above, learning can be transferred to other models (GPT) for forecasting.

Figure 9:
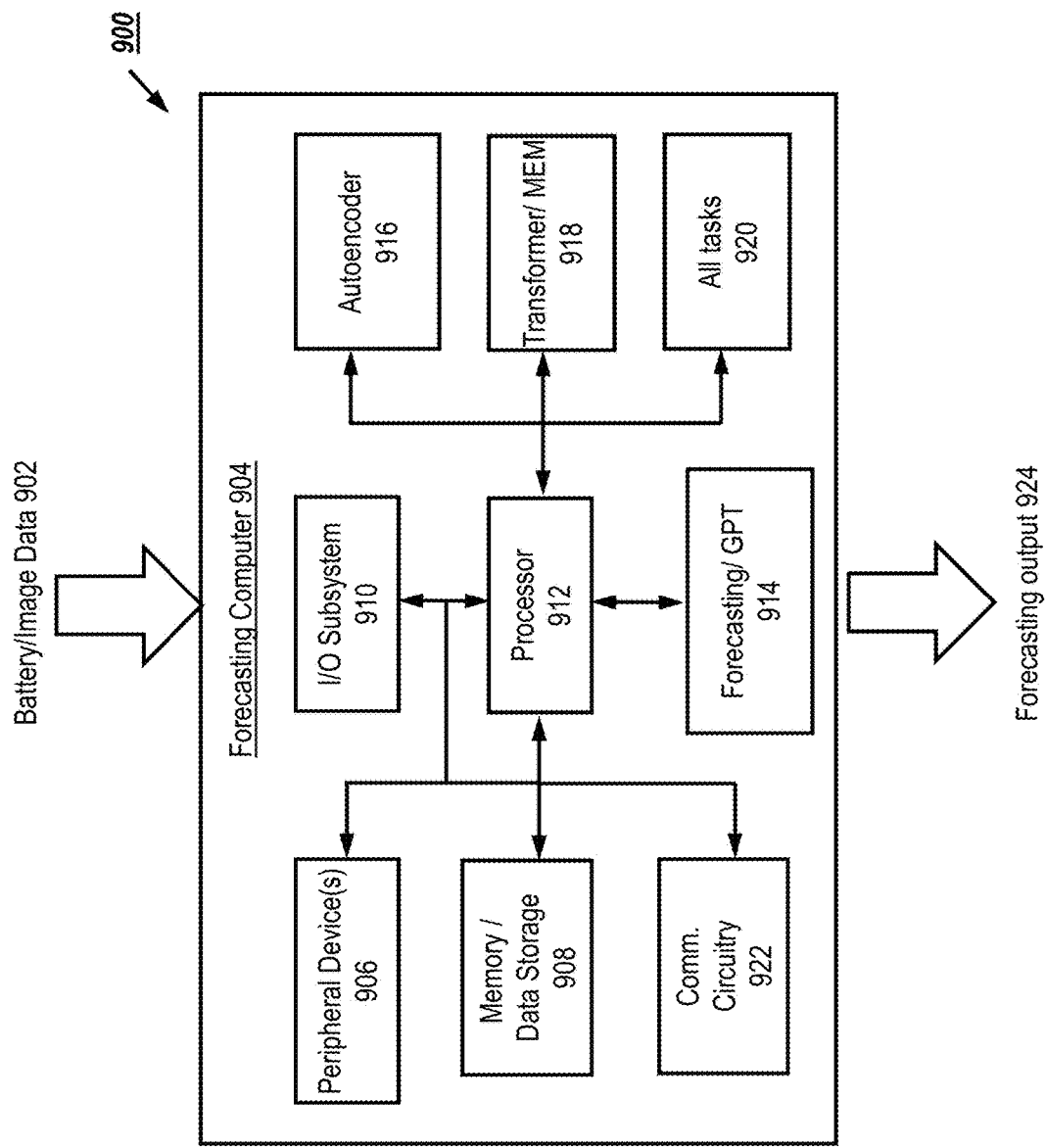
FIG. 9 shows an operating environment 900 for a forecasting computer 904 for forecasting battery characteristics, according to some aspects of the present disclosure.

FIG. 9 shows an operating environment 900 for a forecasting computer 904 for forecasting battery characteristics, according to some aspects of the present disclosure. Operating environment 900 includes a forecasting computer 904 that is configured to communicating over a network. In the illustrative embodiment, the forecasting device 904 includes a processor 912 or processor circuit, one or more peripheral devices 906, memory/data storage 908, communication circuitry 922, input/output (I/O) subsystem 910, an autoencoder circuit 916, transformer circuit 918, downstream task circuit 920 and forecasting circuit 914

Autoencoder circuit 916 of forecasting computer 904 may be configured to receive and process battery/image data 902 using grey scale encoding and Autoencoder to generate image vectors, among other data as described above in connection with FIGS. 2-6. Transformer circuit 918 may be configured to execute a transformer architecture (MEM/BERT) on the battery image data to provide contextualized embeddings, task-specific processing, for downstream tasks circuit 920 and forecasting circuit 914, and other related tasks, as discussed above in connection with FIGS. 2, 5, 7-8. The forecasting computer 904 may further provide a forecasting output 924 for forecasting battery characteristics and usage, which may be used as a basis for controlling EV vehicle operation using one or more operational commands. In some examples, data for any/all of the circuits 914-920 may be incorporated into memory/data storage 306 with or without a secure memory area, or may be a dedicated component, or incorporated into the processor 912. Similarly, while circuits 914-920 are shown as separate components in the figure, a person having ordinary skill in the art will recognize that these circuits 914-920 may be combined into one or more circuits. Of course, forecasting computer 904 may include other or additional components, such as those commonly found in a digital apparatus and/or computer (e.g., sensors, various input/output devices), in other embodiments. Additionally, in some embodiments, one or more of the illustrative components may be incorporated in, or otherwise form a portion of, another component. For example, the memory/data storage 908, or portions thereof, may be incorporated in the processor 912 in some embodiments.

The processor 912 may be embodied as any type of processor currently known or developed in the future and capable of performing the functions described herein. For example, the processor 912 may be embodied as a single or multi-core processor(s), digital signal processor, microcontroller, or other processor or processing/controlling circuit. Similarly, memory/data storage 908 may be embodied as any type of volatile or non-volatile memory or data storage currently known or developed in the future and capable of performing the functions described herein. In operation, memory/data storage 908 may store various data and software used during operation of the processor 912.

Memory/data storage 908 may be communicatively coupled to the processor 912 via an I/O subsystem 912, which may be embodied as circuitry and/or components to facilitate input/output operations with the processor 912, memory/data storage 908, and other components of the Forecasting computer 904. For example, the I/O subsystem 910 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 910 may form a portion of a system-on-a-chip (SoC) and be incorporated, along with the processor 912, memory/data storage 908, and other components of the forecasting computer 904, on a single integrated circuit chip.

The forecasting computer 904 also includes communication circuitry 922 (communication interface) that may include any number of devices and circuitry for enabling communications between forecasting computer 904 and one or more other external electronic devices and/or systems. Similarly, peripheral devices 906 may include any number of additional input/output devices, interface devices, and/or other peripheral devices. The peripheral devices 906 may also include a display, along with associated graphics circuitry and, in some embodiments, may further include a keyboard, a mouse, audio processing circuitry (including, e.g., amplification circuitry and one or more speakers), and/or other input/output devices, interface devices, and/or peripheral devices.

In some illustrative embodiments, the platform of operating environment 900 may be based on a Visual Studio (C#.Net) and SQL Server software environment and may utilize predictive algorithms (e.g., genetic algorithm) to optimize the data. Other languages, such as C, C++, C++/CLI, Visual Basic.NET, C#, F #, JavaScript, TypeScript, XML, XSLT, HTML, and CSS, as well as Python, Ruby, Node.js, M, and other suitable programs may be utilized as well, depending on the specific application. Similarly, operating environment 900 may be configured on any of a number of software modeling platforms including, but not limited to, deep learning frameworks (e.g., TensorFlow, PyTorch, Hugging Face Transformers), cloud-based platforms, natural language processing libraries (e.g., spaCy, NLTK), custom applications and environments (e.g., API access or custom deployment within web applications, mobile apps, or specific hardware setups), containerized environments (e.g., Docker) and integration into existing software systems (e.g., via APIs or SDKs provided by a hosting platform).

Communication to and from the forecasting computer 904 may take place via a computer network that may be operatively coupled to one or more network switches (not shown). In some examples, the network may represent a wired and/or wireless network and may be or include, for example, a local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). Generally, the communication circuitry 922 of forecasting computer 904 may be configured to use any one or more, or combination, of communication protocols to communicate with each other such as, for example, a wired network communication protocol (e.g., TCP/IP), a wireless network communication protocol (e.g., Wi-Fi, WiMAX), a cellular communication protocol (e.g., 5G, Wideband Code Division Multiple Access (W-CDMA)), and/or other communication protocols. As such, the network may include any number of additional devices, such as additional computers, routers, and switches, to facilitate communications to and from the forecasting computer 904.

Figure 10:
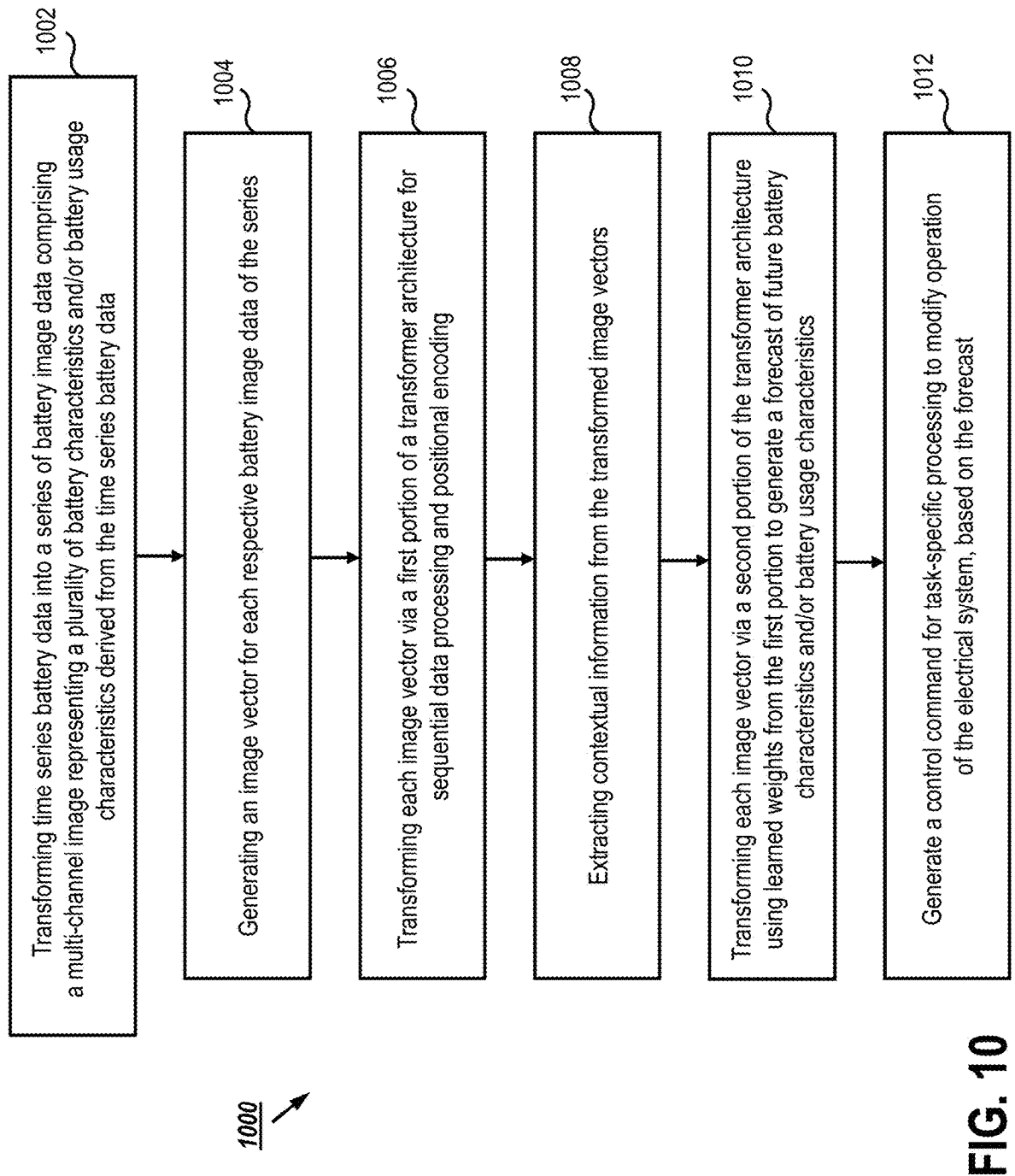
FIG. 10 illustrates a method for controlling an electrical system via battery forecasting, according to some aspects of the present disclosure.

Turning to FIG. 10, a process or method 1000 is disclosed for controlling an electrical system via battery forecasting, according to some aspects of the present disclosure. In block 1002, an apparatus or system (e.g. 900) may transform time series battery data (e.g., 202) into a series of battery image data (e.g., 304, 410) comprising a multi-channel image representing a plurality of battery characteristics and/or battery usage characteristics derived from the time series battery data. In block 1004, the apparatus or system may generate an image vector (e.g., 414, 506) for each respective battery image data of the series. In block 1006, each image vector may be transformed via a first portion of a transformer architecture (e.g., MEM 514) for sequential data processing, and positional encoding.

In block 1008, contextual information is extracted (e.g., via MEM/BERT; 720) from the transformed image vectors and each image vector is transformed in block 1010 via a second portion of the transformer architecture (e.g., GPT 516) using learned weights (e.g., 206) from the first portion (e.g., MEM/BERT 514) to generate a forecast of future battery characteristics and/or battery usage characteristics. In block 1012, a control command is generated for task-specific processing to modify operation of the electrical system, based on the forecast. In some examples, the control command may be configured as a control command from a computer, server or cloud to a vehicle or any other device including an electrical system, to modify operation to implement modifications to the operation of the electrical system to improve battery-related performance, based on the forecast.

In some examples, transforming of time series battery data may include performing grey scale encoding (e.g., 408) of each of the subsequences of the time series of battery data to extract/encode the battery image data of these subsequences. In some examples, generating the image vector (e.g., 414, 506) comprises the transforming of encoded battery image data, i.e. tokenizing, via an autoencoder (e.g., 412, 504). In some examples, generating the image vector comprises flattening the battery image data and processing the flattened battery image data via a Convolutional Neural Network (CNN), and processing the battery image data via an activation function after CNN processing to produce a compressed representation of the battery image data comprising features of interest.

In some examples, the first portion of the transformer architecture comprises a MEM (e.g., 514) and the second portion of the transformer architecture comprises a GPT (e.g., 516). In some examples, transferring the learned weights (e.g., 206) from the MEM to the GPT to generate the forecast (e.g., 518) of future battery characteristics and/or battery usage characteristics.

In some examples, the plurality of battery characteristics and/or battery usage characteristics comprise one or more (e.g., three) characteristics comprising a state of charge (SoC), state of health (SoH), mileage, temperature, voltage, current, internal resistance, cycle count, charging/discharging rates, and location. The contextual information may include information relating to the context representation of the target individual embeddings of the tokenized subsequences of the plurality of battery characteristics and/or battery usage characteristics. In some examples, the method may include one or more of: (i) processing the extracted contextual information via a classification model (e.g., 216) to define classes representing different battery states and/or (ii) processing the extracted contextual information via a regression model (e.g., 214) to extract numerical values or representations ("float") from the embeddings, (iii) processing the extracted contextual information via a clustering algorithm (e.g., 209) to extract clusters characterized by similar battery usage characteristics within each cluster, and (iv) missing data filling of the MEM.

A person having ordinary skill in the art will appreciate that the present disclosure provides novel technologies and techniques for battery data forecasting. By using image representation of battery data, a system may be capable of handling very long and multi-dimension input time series sequence using Grey Scale Encoding. This transforms each feature into 2D matrix and concatenates them together as a color channel image with the number of channels equal to the number of features. Moreover, this allows a system to handle unequal input lengths (e.g., battery cycle which varies between 3 to 14 days) and is very flexible to scale because the image can be resized without significantly losing its information.

Furthermore, utilizing a generalized model such as MEM or BERT, simple layers may be added on top of its output (contextualized embedding), and can perform classification and regression tasks depending on specific use cases. To reduce training time, trained weights can be transferred from MEM to other models such as GPT for battery usage forecasting. Furthermore, the contextualized embedding is meaningful (can be explained by driving attributes) and can be clustered to find battery usage insights (can be represented by 2D plots or images of its embedding). Moreover, the model can be used for missing data filling or to predict the upcoming battery usage since it is trained with the masked embedding method. Still further, the generalized model is small and fast to train and run in inference mode. In some examples, a 2 GB GPU VRAM may be fit for 128 batch size.

While specific examples are provided herein, a person having ordinary skill in the art will recognize that other applications and broader use cases are contemplated in the present disclosure. As disclosed herein, some primary use cases for forecasting of EV battery usage include a general prediction of SoC, which refers to the current amount of charge present in the battery as a percentage of its total capacity. SoC forecasting helps estimate how much battery capacity will be utilized during a specific journey or time period or how much the EV will be charged and when. Another primary use case includes range estimation, which involves forecasting the distance an EV can travel on its remaining battery charge, taking into account factors such as driving conditions, terrain, speed, and battery characteristics to provide an accurate estimate of the remaining range. Another primary use case includes "smart charging:", in which battery usage forecasting can also include predicting future plug in/out and driving events. These can in turn be used to automate charge scheduling. By having an accurate prediction of future charging patterns, delayed charging (V1G) or bidirectional charging (V2G) charging can be executed with lower risk.

Another primary use case includes energy management, in which the amount of energy that will be consumed by various vehicle systems, including propulsion, heating, cooling, and auxiliary functions, can be predicted for forecasting energy consumption. This aids in optimizing energy management strategies and minimizing unnecessary power consumption. Further use cases include application in battery digital twin systems, in which future battery usage can be forecast and fed into a digital twin model to predict how the battery performance characteristics will change over time. Of course, while the above use cases involve electric vehicles, one skilled in the art can appreciate broader use cases for timeseries forecasting which can be in industrial, financial, energy, and agricultural sectors.

As described above, some or all illustrated features may be omitted in a particular implementation within the scope of the present disclosure, and some illustrated features may not be required for implementation of all examples. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for controlling an electrical system via battery forecasting, comprising:
   transforming time series battery data into a series of battery image data comprising a multi-channel image representing a plurality of battery characteristics and/or battery usage characteristics derived from the time series battery data;
   generating an image vector for each respective battery image data of the series;
   transforming each image vector via a first portion of a transformer architecture for sequential data processing and positional encoding;
   extracting contextual information from the transformed image vectors;
   transforming each image vector via a second portion of the transformer architecture using learned weights from the first portion to generate a forecast of future battery characteristics and/or battery usage characteristics; and
   generating a control command for task-specific processing to modify operation of the electrical system, based on the forecast.

2. The method of claim 1, wherein the transforming of time series battery data comprises performing grey scale encoding on each of the time series of battery data to obtain the series of battery image data.

3. The method of claim 2, wherein generating the image vector comprises the transforming/tokenizing of series of grey scaled encoded battery image data via an autoencoder.

4. The method of claim 1, wherein generating the image vector comprises
   flattening the battery image data and processing the flattened battery image data via a Convolutional Neural Network (CNN); and processing the battery image data via an activation function after CNN processing to produce a compressed representation of the battery image data comprising features of interest.

5. The method of claim 1, wherein the first portion of the transformer architecture comprises a Masked Embedding Model (MEM) and the second portion of the transformer architecture comprises a Generative Pre-trained Transformer (GPT).

6. The method of claim 4, further comprising transferring the learned weights from the MEM to the GPT to generate the forecast of future battery characteristics and/or battery usage characteristics.

7. The method of claim 1, wherein the plurality of battery characteristics and/or battery usage characteristics comprise one or more characteristics comprising a state of charge (SoC), state of health (SoH), mileage, temperature, voltage, current, internal resistance, cycle count, charging/discharging rates, and location.

8. The method of claim 6, wherein the contextual information comprises information relating to a context representation of target individual embeddings of tokenized subsequences.

9. The method of claim 1, further comprising one or more of: (i) processing the extracted contextual information via a classification model to define classes representing different battery states and/or (ii) processing the extracted contextual information via a regression model to extract numerical values or representations from the embeddings, (iii) processing the extracted contextual information via a clustering algorithm to extract clusters characterized by similar battery usage characteristics within each cluster, and (iv) missing data filling of MEM.

10. An apparatus for controlling an electrical system via battery forecasting, comprising:
    a processor;
    a communication circuit, operatively coupled to the processor; and
    a memory apparatus, operatively coupled to the processor, wherein the processor and memory are configured to
        transform time series battery data into a series of battery image data comprising a multi-channel image representing a plurality of battery characteristics and/or battery usage characteristics derived from the time series battery data;
        generate an image vector for each respective battery image data of the series;
        transform each image vector via a first portion of a transformer architecture for sequential data processing, and positional encoding;
        extract contextual information from the transformed image vectors;
        transform each image vector via a second portion of the transformer architecture using learned weights from the first portion to generate a forecast of future battery characteristics and/or battery usage characteristics; and
        generate a control command for task-specific processing to modify operation of the electrical system, based on the forecast.

11. The apparatus of claim 9, wherein the processor and memory are configured to transform time series battery data by performing grey scale encoding on each of the time series of battery data to obtain the series of battery image data.

12. The apparatus of claim 10, wherein the processor and memory are configured to generate the image vector by transforming time series battery data that comprises tokenizing the grey scaled encoded battery image data via an autoencoder.

13. The apparatus of claim 9, wherein the processor and memory are configured to generate the image vector by
    flattening the battery image data and processing the flattened battery image data via a Convolutional Neural Network (CNN); and
    processing the battery image data via an activation function after CNN processing to produce a compressed representation of the battery image data comprising features of interest.

14. The apparatus of claim 9, wherein the first portion of the transformer architecture comprises a Masked Embedding Model (MEM) and the second portion of the transformer architecture comprises a Generative Pre-trained Transformer (GPT).

15. The apparatus of claim 13, wherein the processor and memory are configured to transfer the learned weights from the MEM to the GPT to generate the forecast of future battery characteristics and/or battery usage characteristics.

16. The apparatus of claim 9, wherein the plurality of battery characteristics and/or battery usage characteristics comprise one or more characteristics comprising a state of charge (SoC), state of health (SoH), mileage, temperature, voltage, current, internal resistance, cycle count, charging/discharging rates, and location.

17. The apparatus of claim 15, wherein the contextual information comprises information relating to a context representation of target individual embeddings of tokenized subsequences.

18. The apparatus of claim 9, wherein the processor and memory are configured to preform one or more of: (i) process the extracted contextual information via a classification model to define classes representing different battery states and/or (ii) process the extracted contextual information via a regression model to extract numerical values or representations from the embeddings, (iii) process the extracted contextual information via a clustering algorithm to extract clusters characterized by similar battery usage characteristics within each cluster, and (iv) missing data filling of MEM.

19. A method for controlling an electrical system via battery forecasting, comprising:
    transforming time series battery data into a series of battery image data comprising an encoded multi-channel image representing a plurality of battery characteristics and/or battery usage characteristics derived from the time series battery data;
    generating an image vector for each respective battery image data of the series;
    transforming each image vector via a Masked Embedding Model (MEM) for sequential data processing and positional encoding;
    extracting contextual information from the transformed image vectors;
    transforming each image vector via a Generative Pre-trained Transformer (GPT) using learned weights from the first portion to generate a forecast of future battery characteristics and/or battery usage characteristics; and
    generating a control command for task-specific processing to modify operation of the electrical system, based on the forecast.

20. The method of claim 18, wherein the transforming of time series battery data comprises performing grey scale encoding on each of the time series of battery data to obtain the series of battery image data.

\* \* \* \* \*